United States Patent [19]

Stimpson

[11] Patent Number: 4,823,419
[45] Date of Patent: Apr. 25, 1989

[54] MULTI-PURPOSE UTENSIL FOR FOOD PREPARATION

[76] Inventor: Cynthia C. Stimpson, 8611 Inverness Dr. N.E., Seattle, Wash. 98115

[21] Appl. No.: 232,112

[22] Filed: Aug. 12, 1988

[51] Int. Cl.⁴ ............................................. B25F 1/00
[52] U.S. Cl. ......................................... 7/113; 7/164; 7/167; 30/142; 294/2
[58] Field of Search ................. 7/110, 112, 113, 163, 7/164, 167, 170; 30/142, 147, 149, 150, 148, 324, 325, 353; 294/2, 27.1

[56] References Cited

U.S. PATENT DOCUMENTS

| | | | |
|---|---|---|---|
| 24,716 | 7/1859 | Bristol | 30/150 |
| D. 235,307 | 6/1975 | Shoemaker | 30/324 |
| 398,264 | 2/1889 | Kisner | 30/150 |
| 1,191,608 | 7/1916 | Miner | 30/142 |
| 2,457,037 | 12/1948 | Fadeley, Jr. | 30/324 |
| 2,814,870 | 12/1957 | Treiber | 30/148 |
| 3,056,200 | 10/1962 | Williams | 30/148 |
| 3,596,965 | 8/1971 | Woofter | 30/150 |
| 3,669,133 | 6/1972 | Hyman | 135/45 |
| 4,231,128 | 11/1980 | James | 7/112 |
| 4,587,734 | 5/1986 | Jonsson | 30/325 |

Primary Examiner—Roscoe V. Parker
Attorney, Agent, or Firm—Robert W. Jenny

[57] ABSTRACT

The utensil has a handle with a spoon/ladle assembly at one end and a spatula assembly at the other. The handle comprises two hollow telescopically engaged parts held in engagement by an elastic cord enclosed in the handle parts. The utensil is collapsed (folded) by disengaging the handle parts against the tension of the cord and folding the two assemblies to nest with each other, held in the collapsed mode by a detent with the cord functioning as a hinge. The spatula assembly is adapted to serve as a spatula, a grater, a cutter and a strainer. The spoon/ladle (spadle) assembly is adapted to function as a spoon, ladle, measuring container, and pot lifter/holder. When folded but not held folded by the detent the utensil functions as tongs. The handle is marked to serve as a linear measuring instrument.

15 Claims, 2 Drawing Sheets

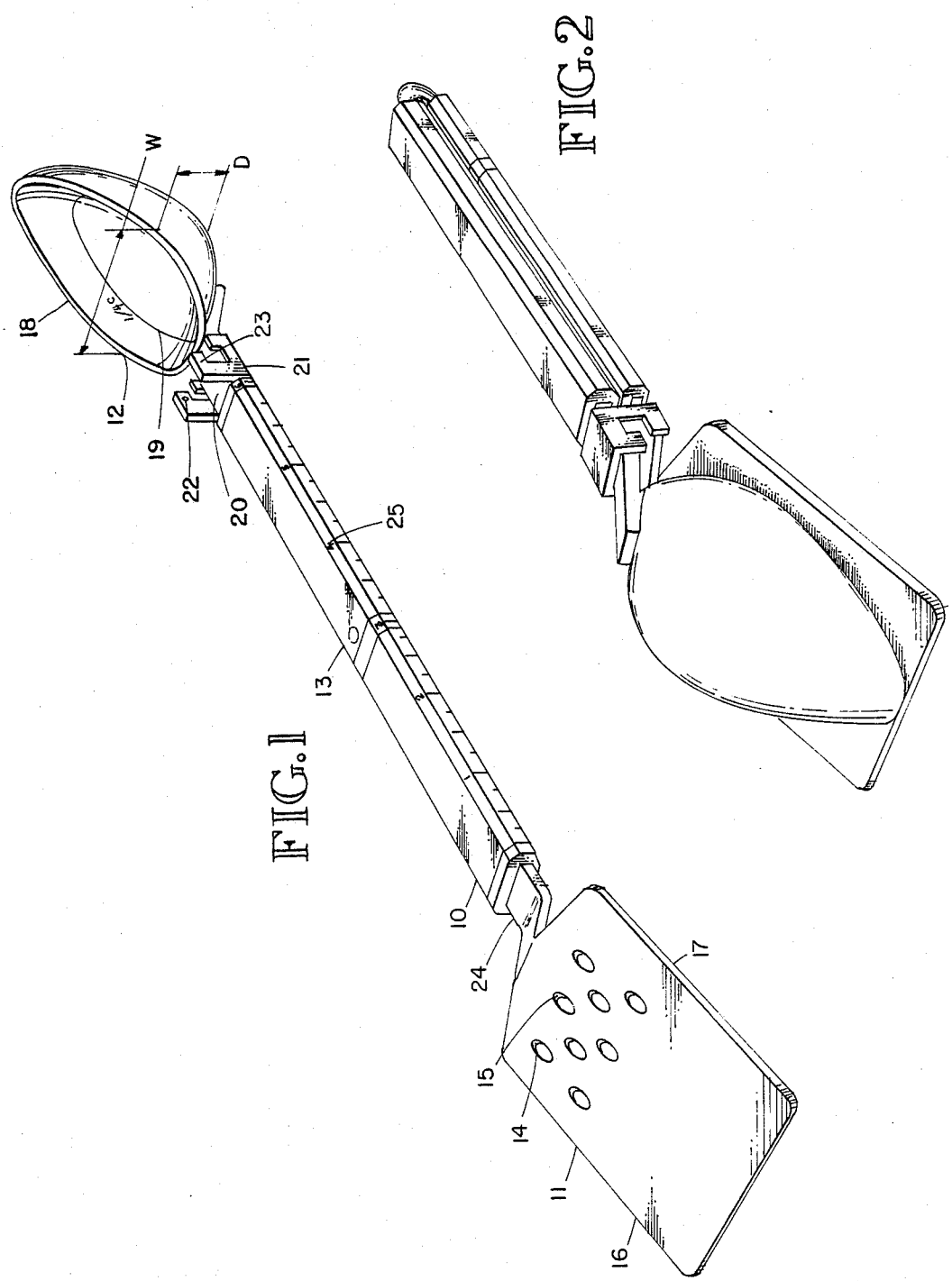

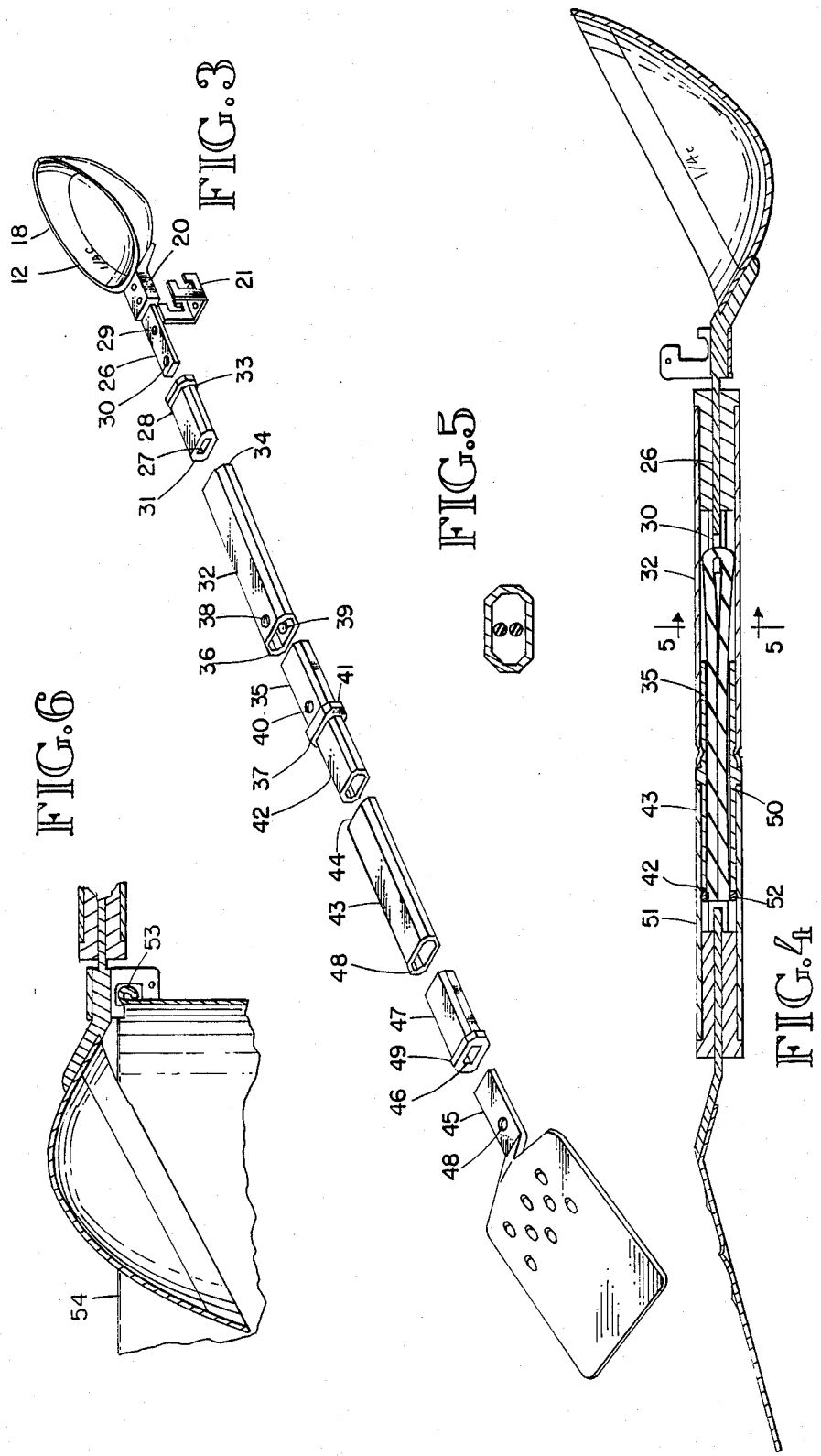

MULTI-PURPOSE UTENSIL FOR FOOD PREPARATION

BACKGROUND OF THE INVENTION

1. Field

The subject invention is in the field of utensils used for the preparation of food including cooking. More specifically it is in the field of such utensils which are useful for more than one purpose. Still more specifically it is in the field of multipurpose utensils intended for use in the field and made collapsible to facilitate such use.

2. PRIOR ART

Prior art for this invention includes the following patents:

| U.S. Pat. Nos.: | 24,716 | Great Britain: | 666,669 |
|---|---|---|---|
| | 1,191,608 | | |
| | 2,457,037 | | |
| | 2,814,870 | Germany: | 175,992 |
| Design: | 235,307 | | |

This listing, of course, is not fully inclusive of patented items and there is known prior art that is not patented. However, it is not known that any of the pertinent prior art has achieved significant commercial success. It is believed that chances of commercial success of such a utensil will be enhanced if the number of its purposes is increased without corresponding increase in its complexity and cost. Therefore a prime objective of the subject invention is provision of a multi-purpose utensil for food preparation having at least nine purposes. A further objective is that the utensil not be unduly complicated in order to achieve the prime objective. Still further objectives are that the utensil be optimized for outdoor use in that it is lightweight, collapsible for compactness when not in use and free of sharp points, edges and the like when collapsed. A further objective is that the utensil be readily manufacturable and correspondingly economical to produce.

SUMMARY OF THE INVENTION

The subject utensil comprises an elongated handle with utensil apparatus attached at each end of the handle. The handle is foldable at a point along its length such that when the handle is folded the apparatuses at the ends nest compactly. Detent means are provided to hold the utensil folded.

The apparatus at one end comprises a combination spoon and ladle and a pot holder. The ladle is graduated to serve as a quantity measuring means. The pot holder engages the rolled edge of metal pots commonly used for outdoor cooking and facilitates handling of such pots when they are hot. The spoon/ladle (spadle) is especially shaped to provide optimum capacity for its size, more controlled delivery of its contents, and optimized access to the interior of containers. The apparatus at the other end of the handle comprises a spatula adapted by specially shaped holes to function as a grater and as a strainer useful in retaining the solids in a container while pouring off the liquids. One edge of the spatula is sharpened and serrated to function as a chopper, cutter, slicer or saw. The handle itself comprises two parts adapted to fit together end-to-end telescopically to form the handle. At the ends of the parts which join to form the handle, one part has an extension which telescopes into the hollow end of the other part. The two parts are held assembled by an elastic cord or cords inside the handle parts and fastened to the insides of each of the parts of the assembled handle. The handle is disassembled and the utensil collapsed by pulling the handle parts apart against the force of the elastic and then hinging the spadle and spatula ends together. The separation in the handle is located so that the ends of the handle parts exposed by the collapsing (folding) are even when the spadle and spatula ends are nested against each other. Detent means incorporated in the pot holder engage a shank portion of the spatula to hold the utensil folded. Before the detent engages and with the handle partly folded, the utensil is useful as tongs for handling hot materials, salads and the like. The handle is marked in units of length for use, for example, in determining if shellfish are of legally acceptable size.

It can be understood from the above that the utensil can function as the following distinct items:

| | |
|---|---|
| spatula | spoon |
| grater | ladle |
| pot lifter (holder) | measuring container |
| tongs | ruler |
| strainer | cutter (slicer, chopper, saw) |

The invention is described in more detail below with reference to the attached drawings.

BRIEF DESCRIPTION OF THE DRAWINGS

FIG. 1 is a perspective view of the utensil ready for use.

FIG. 2 is a perspective view of the invention collapsed.

FIG. 3 is an exploded view of the utensil.

FIG. 4 is a sectional view of the utensil ready for use, the view taken through the longitudinal centerline in a plane perpendicular to the broad surfaces of the spatula.

FIG. 5 is a sectional view taken at 5—5 in FIG. 4.

FIG. 6 is a side view of the spadle portion used as a pot holder/lifter.

DETAILED DESCRIPTION OF THE INVENTION

The subject utensil 10 is shown ready for use in FIG. 1 and comprises a spatula assembly 11, a spoon/ladle assembly 12 and a handle assembly 13. The term spoon/ladle is hereinafter shortened to the term spadle. Specially shaped, sharpened and oriented holes, of which holes 14 and 15 are typical, in spatula 16 of the spatula assembly adapt the spatula assembly to provide a grater function to the utensil. Edge 17 of the spatula is sharpened and serrated to adapt the spatula assembly to function as a cutter (slicer, chopper, saw).

Spadle 18 of the spadle assembly is spoonlike but specially shaped to enhance its various functions. It is deeper for its width than conventional spoons, the range of its width W to its depth D being in the range of 2 to 2.5 as compared to the ratio range of 4.0 to 5.0 for conventional tablespoons. Also, its tip is more sharply shaped than that of conventional spoons. These features enhance the function of the spadle. Its capacity as a measure is increased relative to its overall size by the added depth and the specially shaped, small radius tip enhances accurate delivery of the contents as well as providing better access to the corners and crevices in containers. The spadle is marked with suitable capacity indicia, mark 19 being typical to adapt it to function as a measurement means.

The spadle is attached to the handle by shank 20, shown in more detail below. Clip 21 is attached to the shank and functions as a pot lifter/holder, also shown in more detail below. Detent bump 22 and another opposing it on tab 23 snap over shank 24 of the spatula assembly to hold the utensil collapsed for carrying. The collapsed or folded utensil is shown in FIG. 2 with the parts of the handle in parallel proximity and the spatula and spadle assemblies compactly nested. The utensil folded but not held folded by the detent means functions as a tongs, such as for serving salad greens.

The indicia 25 on the handle assembly (FIG. 1) adapt it to use as a ruler, i.e. measuring instrument for use, for example, in checking the size of shellfish to determine whether or not they can be legally kept.

FIG. 3 is an exploded view of the utensil. The spadle assembly 12 comprises, in addition to spadle 18, shank 20 and clip 21, tab 26 which fits through hole 27 in plug 28. Plug 28 may be a separate part or may be molded onto (or possibly as part of) the shank. Hole 29 in tab 26 is used in retaining the plug in position on the tab. Hole 30 in tab 26 is exposed beyond end 31 of the plug and is used in holding the utensil together as explained below. Plug 28 telescopes into handle segment 32 until ridge 33 contacts end 34 of segment 32 and the spadle assembly is held in place by an elastic cord as explained below. Segment 32 telescopes onto segment 35 until its end 36 contacts ridge 37 on segment 35. This telescoping of segments 32 and 33 is the attachment/detachment action of the utensil parts for folding it. Holes 38 and 39 snap over bumps 40 and 41 (not shown) to help hold the utensil in its assembled configuration.

End 42 of segment 35 telescopes into segment 43 until end 44 of segment 43 contacts ridge 37. Tab 45 of the spatula assembly fits through hole 46 in plug 47. Plug 47 may be a separate piece or may be molded onto the shank. Hole 48 in tab 45 is used in retaining the plug on the shank. Plug 47 telescopes into segment 43 until end 48 of the segment contacts ridge 49 on plug 47 and it is held assembled by adhesives.

Final assembly of the utensil is described with reference to FIG. 4, a sectional view of the utensil ready for use, the view taken through the longitudinal centerline of the utensil in a plane perpendicular to the broad surfaces of the spatula. The parts in this view are numbered to correspond with their numbering in FIG. 3. In FIG. 4 elastic cord 50 is threaded through hole 30 in tab 26 and extends through segments 32 and 35 into cavity 51 beyond end 42 of segment 35 and its ends are held together there by crimp ring 52. The cord is installed and the crimp ring put in place before segment 43 is telescoped onto segment 35 and held assembled by adhesive. When the utensil is folded the cord is stretched as segment 32 is moved off segment 35 and then the cord serves as a hinge while the utensil is used as tongs or while the utensil is folded and held folded by the detents as explained before.

FIG. 5 is a sectional view taken at 5—5 in FIG. 4 and illustrates preferred crossectional configuration of the handle portion.

FIG. 6 is a side view of the spadle portion with clip 21 being used to hold the rolled edge 53 (shown in section) of a pot 54. The details of clip 21 are similar to those of commercially available pot holders.

It is considered to be clear from this description that the invention meets its objectives. It provides a multipurpose utensil for food preparation having at least nine purposes, the purposes including those served by a:

| | |
|---|---|
| spatula | spoon |
| grater | ladle |
| pot lifter/holder | measuring container |
| tongs | strainer |
| ruler | cutter (slicer, chopper, saw) |

The utensil is not complicated to manufacture or use and it is lightweight, compact when folded, and presents a minimum of sharp edges and points when it is folded. Further, the parts are readily manufacturable and accordingly economical to produce.

It is also considered to be clear that while a preferred embodiment of the invention is disclosed herein, other embodiments and modifications of the one disclosed are possible within the scope of the invention which is limited only by the attached claims.

What is claimed is:

1. A multi-purpose utensil comprising:
a spoon/ladle assembly,
a spatula assembly, and
a handle assembly,
said handle assembly comprising a first part and a second part, said first part having a first end and a second end, said first end being attached to said spoon/ladle assembly,
said second part having a third end and a fourth end, said fourth end being attached to said spatula assembly,
said third end fitting telescopically into said second end, whereby when said second and third ends are telescopically engaged said utensil comprises said handle assembly with said spoon/ladle assembly at one end and said spatula assembly at its other end and, when said second and third ends are telescopically disengaged said first part with said spoon/ladle assembly attached can be placed adjacent to said second part with said spatula assembly attached with said first and second parts in parallel proximity to each other and said spoon/ladle and spatula assemblies nested next to each other.

2. The utensil of claim 1 in which said first and second parts are hollow and interconnected by an elastic cord inside said first and second parts, whereby said cord tends to hold said first and second parts in telescopic engagement and serves as a hinge between them when they are disengaged and placed in parallel proximity.

3. The utensil of claim 1 in which said spatula assembly is adapted to function as a spatula and a grater.

4. The utensil of claim 2 in which said spatula assembly is adapted to function as a spatula and a grater.

5. The utensil of claim 1 in which said spoon/ladle is adapted by indicia on it to serve as a measuring container.

6. The utensil of claim 2 in which said spoon/ladle is adapted by indicia on it to serve as a measuring container.

7. The utensil of claim 3 in which said spoon/ladle is adapted by indicia on it to serve as a measuring container.

8. The utensil of claim 4 in which said spoon/ladle is adapted by indicia on it to serve as a measuring container.

9. The utensil of claims 1, 2, 3, 4, 5, 6, 7 or 8 in which said spatula assembly is further adapted to function as a cutter.

10. The utensil of claims 1, 2, 3, 4, 5, 6, 7 or 8 in which said handle assembly bears indicia to enable its function as a linear measurement means.

11. The utensil of claims 1, 2, 3, 4, 5, 6, 7 or 8 in which said spatula assembly is further adapted to function as a cutter and said handle assembly bears indicia to enable its function as a linear measurement means.

12. The utensil of claims 1, 2, 3, 4, 5, 6, 7 or 8 in which said spatula assembly is further adapted to function as a strainer.

13. The utensil of claims 1, 2, 3, 4, 5, 6, 7 or 8 in which said spatula assembly is further adapted to function as a cutter and said spatula assembly is further adapted to function as a strainer.

14. The utensil of claims 1, 2, 3, 4, 5, 6, 7 or 8 in which said handle assembly bears indicia to enable its function as a linear measurement means and said spatula assembly is further adapted to function as a strainer.

15. The utensil of claims 1, 2, 3, 4, 5, 6, 7 or 8 in which said spatula assembly is further adapted to function as a cutter, said handle assembly bears indicia to enable its function as a linear measurement means and said assembly is further adapted to function as a strainer.

* * * * *